(12) United States Patent
Kawasaki et al.

(10) Patent No.: US 6,412,458 B2
(45) Date of Patent: *Jul. 2, 2002

(54) VALVE TIMING CONTROL FOR ENGINE

(75) Inventors: Takao Kawasaki, Kanagawa; Masahiro Arai, Yokohama, both of (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/728,477

(22) Filed: Dec. 4, 2000

(30) Foreign Application Priority Data

Dec. 3, 1999 (JP) .............................. 11-344216

(51) Int. Cl.$^7$ ................................. F01L 1/34
(52) U.S. Cl. .............. 123/90.15; 73/118.2; 123/568.14; 123/348
(58) Field of Search .................... 73/118.2, 117.3; 123/568.14, 568.21, 347, 348, 90.15, 90.16, 90.17, 90.18

(56) References Cited

U.S. PATENT DOCUMENTS

| 6,178,934 B1 | 1/2001 | Hirasawa et al. ........ 123/90.11 |
| 6,189,512 B1 * | 2/2001 | Kawasaki .................. 123/479 |

FOREIGN PATENT DOCUMENTS

JP          10-037727       2/1998

OTHER PUBLICATIONS

U.S. application No. 09/442,031, filed Nov. 17, 1999, Arai et al.
U.S. application No. 09/634,008, filed Aug. 7, 2000, Hirasawa et al.
U.S. application No. 09/634,880, filed Aug. 7, 2000, Hirasawa et al.
U.S. application No. 09/635,685, filed Aug. 10, 2000, Toriumi.
U.S. application No. 09/686,992, filed Oct. 11, 2000, Arai et al.
U.S. application No. 09/725,710, filed Nov. 30, 2000, Kawasaki et al.
U.S. application No. 09/727,552, filed Dec. 4, 2000, Arai et al.
U.S. application No. 09/727,554, filed Dec. 4, 2000, Arai et al.
U.S. application No. 09/727,787, filed Dec. 4, 2000, Kawasaki et al.
U.S. application No. 09/727,789, filed Dec. 4, 2000, Arai et al.
U.S. application No. 09/727,790, filed Dec. 4, 2000, Kawasaki et al.
U.S. application No. 09/734,611, filed Dec. 13, 2000, Arai et al.
U.S. application No. 09/736,576, filed Dec. 15, 2000, Hori et al.
U.S. application No. 09/764,071, filed Jan. 19, 2001, Toriumi.

* cited by examiner

*Primary Examiner*—Thomas Denion
*Assistant Examiner*—Jaime Corrigan
(74) *Attorney, Agent, or Firm*—Foley & Lardner

(57) ABSTRACT

A control system controls an intake air quantity to an engine by controlling an intake valve closing timing, instead of, or in cooperation with, a throttle valve. A controller estimates a quantity of internal EGR gases remaining in a cylinder, and controls the intake valve closing timing to a desired target timing determined in due consideration of the estimated internal EGR quantity. The estimated internal EGR quantity is a sum of a base quantity and an increase correction quantity determined in accordance with a valve overlap period, its middle angular position in crankshaft rotation and intake pressure. The target intake valve closing timing is determined in accordance with a target intake air quantity and the estimated internal EGR quantity.

20 Claims, 8 Drawing Sheets

EXHAUST VALVE CLOSING TIMING (EVC)

VALVE TIMING CONTROL FOR ENGINE

BACKGROUND OF THE INVENTION

The present invention relates to control technique for controlling valve events of an engine with an actuator such as solenoid actuator, and in particular to control of an intake valve closing timing to vary an intake air quantity to obtain a desired engine torque.

Unlike an engine of a conventional type controlling the intake air quantity with a throttle valve, an engine of a new type (proposed by a Published Japanese Patent Application, Kokai No. H10(1998)-37727) is arranged to control the intake air quantity mainly by controlling the intake valve closing timing.

An intake air control system of such a type for controlling the intake air quantity by controlling the intake valve closing timing achieves a target air quantity (required intake air quantity) corresponding to required torque by controlling the volume of cylinder intake air corresponding to an effective intake stroke determined by the intake valve closing timing, at the intake pressure that is held approximately constant at the atmospheric pressure in the absence of a throttle valve, and that is determined in dependence on the throttle opening when there is provided a throttle valve.

SUMMARY OF THE INVENTION

To control the intake air quantity accurately by controlling the intake valve closing angle, the intake valve is to be closed at a piston position at which the cylinder contains an amount of fresh air corresponding to the target air quantity in addition to an amount of residual gases (internal EGR quantity) remaining in the combustion chamber. The internal EGR quantity of residual gases is influenced deeply by the existence or nonexistence of valve overlap and the length of valve overlap. The valve overlap condition has a great influence on the internal EGR quantity especially in a solenoid type valve actuating system having such a high response speed in opening and closing valves that the exhaust and intake valves are both held approximately in the fully open state during a valve overlap period. Accordingly, it has been found that simple correction or compensation for the internal EGR quantity is not always adequate for controlling intake air quantity and hence engine torque accurately. Moreover, even by a system devised to set target exhaust valve closing timing and target intake valve opening timing to obtain a proper internal EGR quantity and to adjust the target intake valve closing timing in conformity with the setting of the valve timings, an adequate control is difficult since the actual internal EGR quantity is affected by other factors besides valve timings.

It is, therefore, an object of the present invention to provide control apparatus and/or method capable of controlling the intake valve closing timing accurately and thereby controlling the intake air quantity and hence engine torque adequately.

According to the present invention, a control apparatus for controlling an intake air quantity to the engine by varying an intake valve closing timing of the engine comprises a controller that is configured or programmed:

to calculate a target air quantity in accordance with an engine operating state,
to calculate an estimated internal EGR quantity of the engine in accordance with the engine operating state,
to calculate a target intake valve closing timing in accordance with the target air quantity and the estimated internal EGR quantity, and
to control an actual intake air quantity to the engine by controlling an actual intake valve closing timing of the engine to achieve the target intake valve closing timing.

A control apparatus according to one aspect of the invention comprises: means for determining the estimated internal EGR quantity; means for determine the target intake valve closing timing in accordance with at least the estimate internal EGR quantity; and means for controlling the intake air quantity to the engine by controlling an actual intake valve closing timing of the engine to the target intake valve closing timing.

According to the present invention, a control process for varying valve timings of intake and exhaust valves of an engine, comprises: estimating an internal EGR quantity in accordance with an engine operating state; and controlling an intake valve closing timing in accordance with a required intake air quantity and the internal EGR quantity.

DETAILED DESCRIPTION OF THE INVENTION

Figure 1:
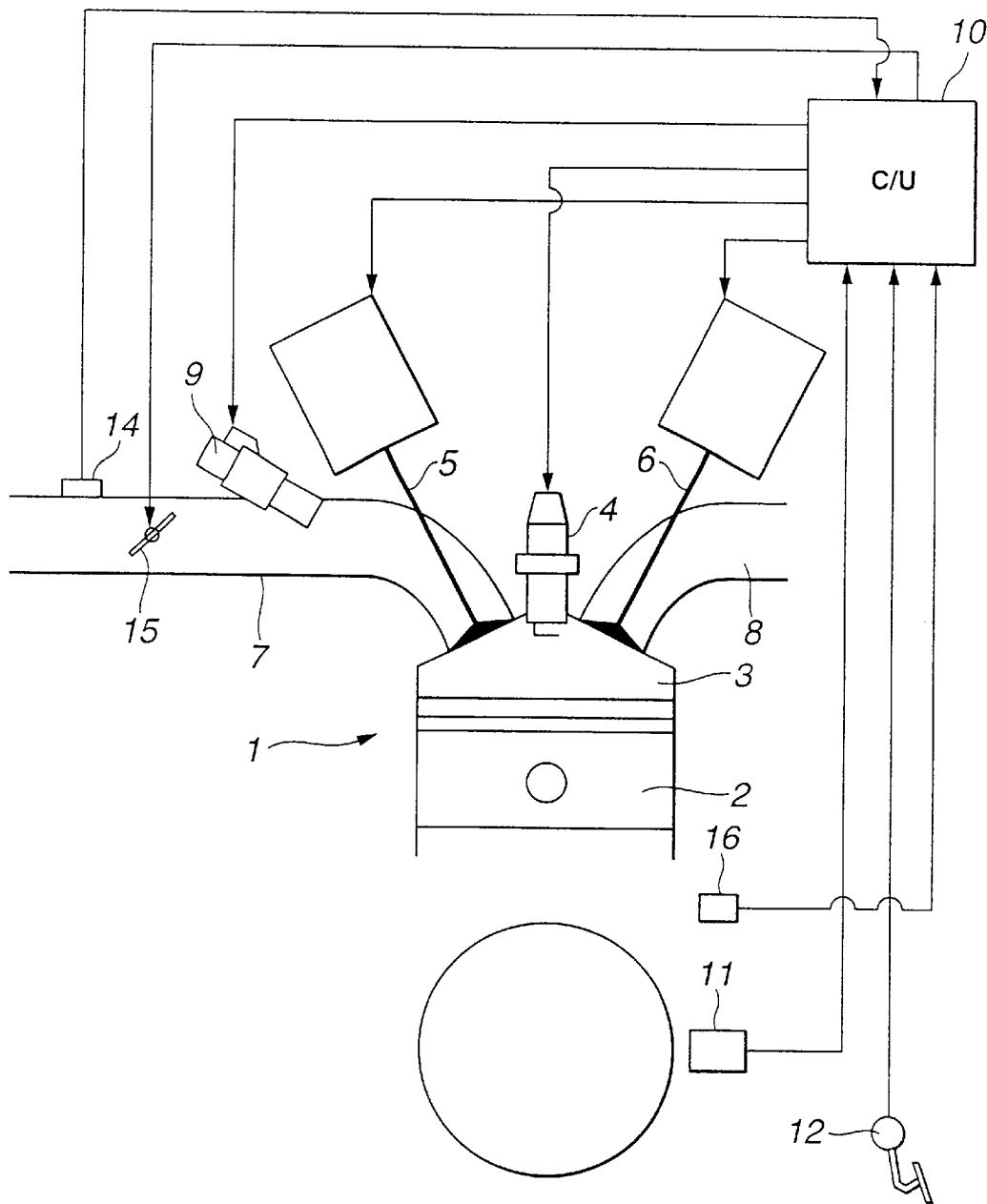
FIG. 1 is a schematic view showing an engine provided with a variable valve timing actuator and a control unit according to one embodiment of the present invention.

FIG. 1 shows a control system according to one embodiment of the present invention.

As shown in FIG. 1, an engine 1 has a plurality of cylinders each having a combustion chamber 3 defined by a piston 2. Combustion chamber 3 of each cylinder has a spark plug 4, and intake and exhaust valves 5 and 6 of an electromagnetic drive type. An intake passage 7 is for admitting air into each combustion chamber 3, and an exhaust passage 8 conveys the exhaust gases away from engine 1.

Figure 2:
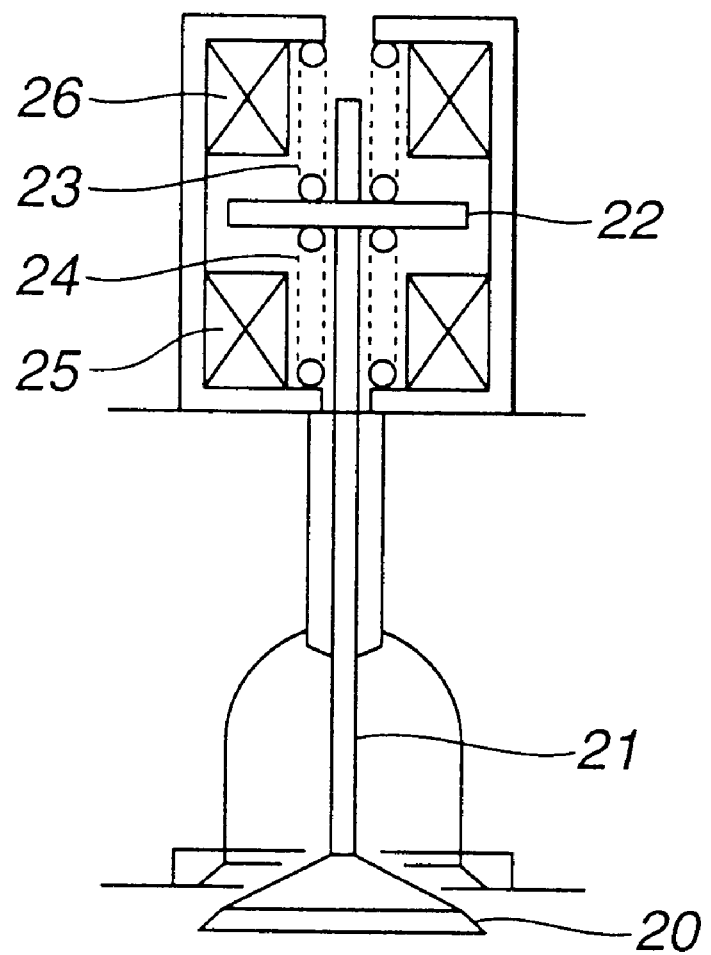
FIG. 2 is a view for illustrating a solenoid drive device for intake or exhaust valve employed in the system of FIG. 1.

FIG. 2 schematically shows a solenoid (electromagnetic) valve actuator for intake or exhaust valves 5 or 6. A valve element 20 is attached to one end of a valve stem 21. A plate-shaped movable member 22 is attached to valve stem 21. Movable member 22 is normally held at a neutral position by springs 23 and 24. An opening solenoid (electromagnetic coil) 25 is disposed below movable member 22, and a closing solenoid (electromagnetic coil) 26 is above movable member 22.

Before a start of engine 1, movable member 22 is operated to oscillate resonantly by energizing opening and closing solenoids 25 and 26 alternately. When the amplitude is increased sufficiently, movable member 22 is attracted and held by one of the solenoids 25 and 26.

The valve is moved from a closed state to an open state by deenergizing upper closing solenoid 26 attracting movable member 22, thereby allowing movable member 22 to move downwards by the biasing force of spring 23, and attracting movable member 22 by energizing lower opening solenoid 25 when movable member 22 approaches lower opening solenoid 25 sufficiently. Thus, valve element 20 is lifted from a valve seat and the valve is opened.

The valve is moved from the open state to the closed state by deenergizing lower opening solenoid 25 attracting movable element 22, thereby allowing movable member 22 to move upwards by the biasing force of spring 24, and attracting movable member 22 by energizing upper closing solenoid 26 when movable member 22 approaches upper closing solenoid 25 sufficiently. Thus, valve element 20 is seated on the valve seat and the valve is closed.

As shown in FIG. 1, there is provided, in intake passage 7, an air flowmeter 14 for sensing an intake air quantity, and a throttle valve 15 whose opening degree is controlled electronically. A solenoid type fuel injector 9 is provided in the intake port for each cylinder.

A control unit (C/U) 10 controls intake and exhaust valves 5 and 6, throttle valve 15, fuel injectors 9 and spark plugs 4, in accordance with input information on engine operating conditions collected by various sensors. A crank angle sensor 11 produces a crank angle signal in synchronism with the engine revolution. An engine speed (rpm) can be determined from the crank angle signal. An accelerator pedal sensor 12 is arranged to sense an accelerator opening (or accelerator pedal depression degree). The signals of these sensors are inputted to control unit 10 serving as a main component of a controller in the control system.

In accordance with the engine operating conditions such as the accelerator opening (degree) and engine speed, this control system controls the actual intake air quantity so as to achieve a target torque mainly by controlling the closing timing of intake valve 5. Moreover, to reduce exhaust emissions, especially the amount of NOx, this control system further controls the closing timing of exhaust valve 6, and the opening timing of intake valve 5 (and the opening timing of exhaust valve 6) to control the internal EGR quantity to an adequate level in accordance with engine operating conditions. In practice, however, the internal EGR quantity is affected not only by these valve timings but other factors as well. Therefore, this control system is arranged to estimate the internal EGR quantity in accordance with engine operating conditions, and to adjust the closing timing of intake valve 5 (of each cylinder, to be exact) in accordance with the estimated internal EGR quantity.

The control system determines the intake air quantity in accordance with sensed values supplied from various sensors, and controls the fuel injection quantity of fuel injector 9 (of each cylinder, to be exact) in accordance with the intake air quantity.

Figure 3:
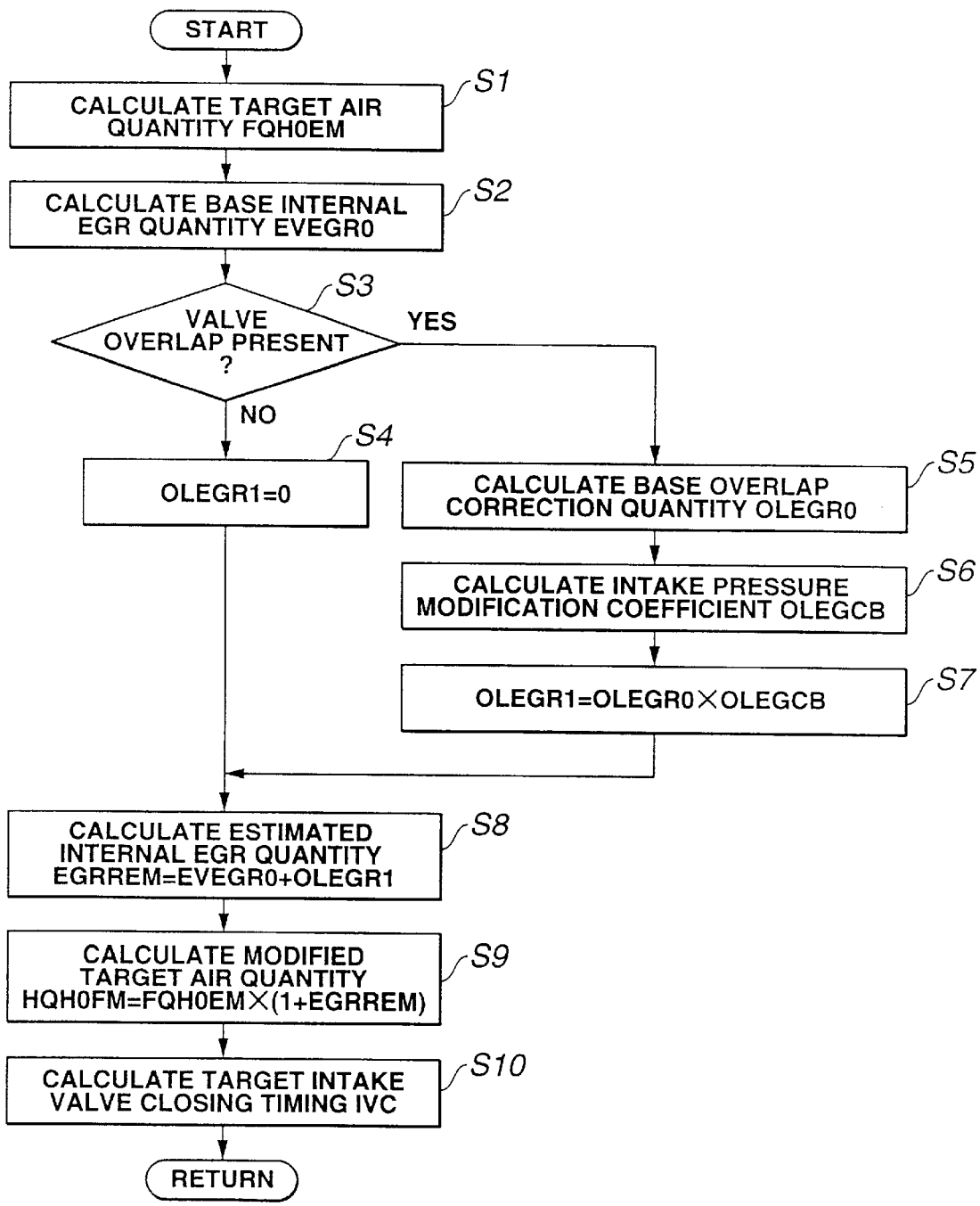
FIG. 3 is a flowchart showing a routine for setting an intake valve closing timing according to the embodiment.

FIG. 3 shows a main routine for controlling the intake valve closing timing according to the embodiment of the present invention.

Step S1 is a step for reading the accelerator opening sensed by accelerator pedal sensor 12, the engine speed sensed by crank angle sensor 11 etc., and for calculating a target air quantity FQH0EM adequate for a demanded torque.

Figure 4:
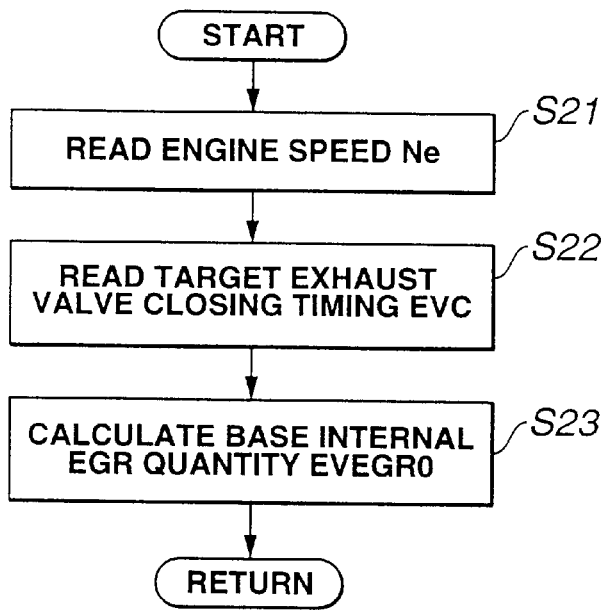
FIG. 4 is a flowchart showing a subroutine for determining a base internal EGR quantity in a non-overlap state according to the embodiment.

Step S2 calculates a base internal EGR quantity EVEGR0 representing the internal EGR quantity in the non-overlap state in which there is no valve overlap of intake and exhaust valves. This calculation is carried out by following a subroutine shown in FIG. 4.

Figure 7:
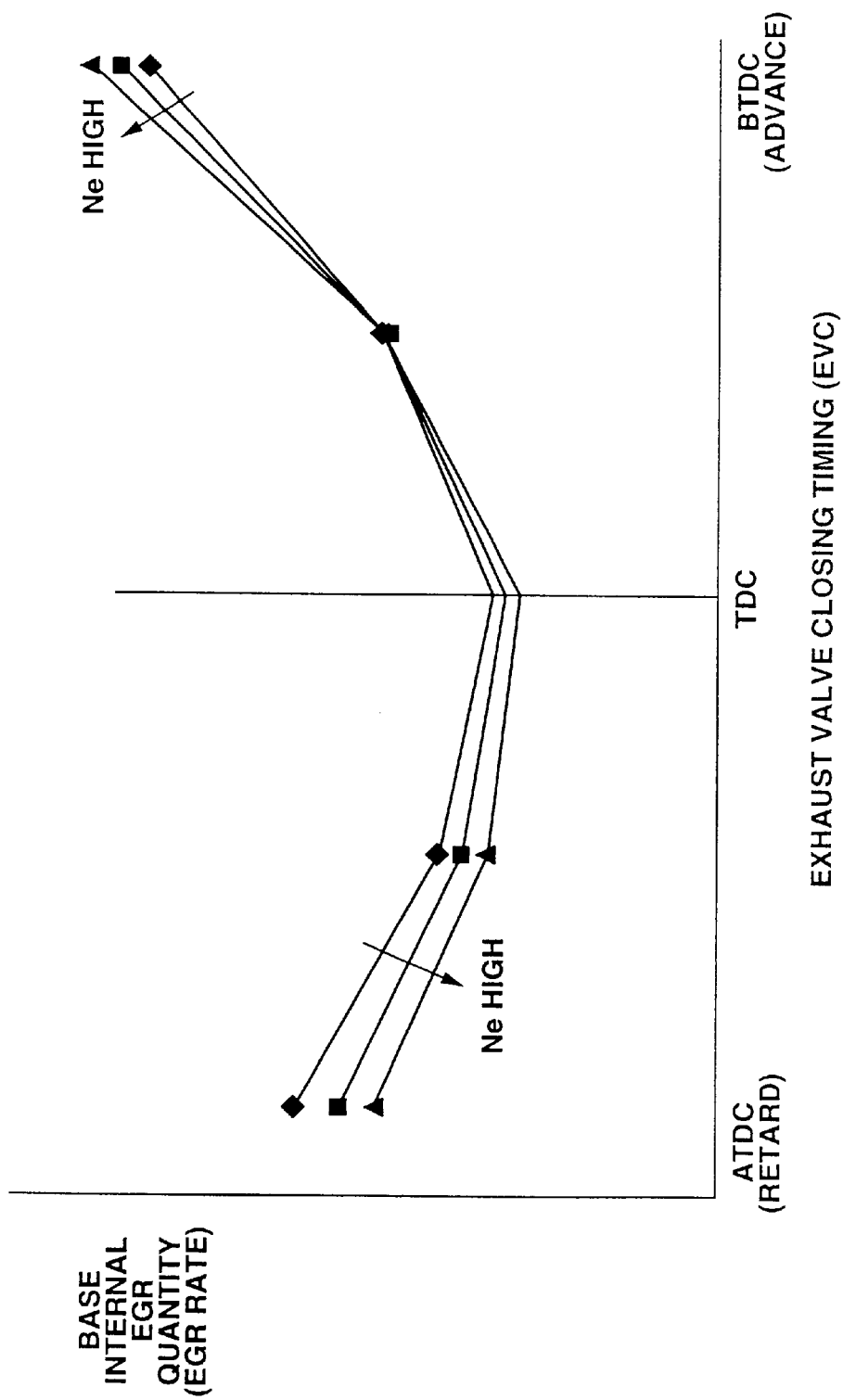
FIG. 7 is a graph showing a characteristic of the base internal EGR quantity.

At steps S21 and S22, control unit 10 reads an engine speed Ne and a target exhaust valve closing timing EVC. In accordance with the values obtained at steps S21 and S22, control unit 10 calculates base internal EGR quantity EVEGR0, as EGR rate with respect to target air quantity FQH0EM, at step S23, by lookup from a map table prepared from characteristic data as shown in FIG. 7. Base internal EGR quantity EVEGR0 is a quantity of burned gases remaining in a cylinder in the non-overlap state in which there is no overlap of the intake and exhaust valves. Accordingly, as the cylinder volume determined by the piston position at the exhaust valve closure timing EVC becomes smaller, base internal EGR quantity EVEGR0 decreases. Base internal EGR quantity EVEGR0 becomes smallest at top dead center, as shown in FIG. 7. For the same piston position, base internal EGR quantity EVEGR0 differs between the condition before top dead center (BTDC) and the condition after top dead center (ATDC). When EVC is before top dead center, the exhaust valve is closed in the state the residual gas mixture is somewhat compressed. When EVC is after top dead center, on the other hand, the exhaust valve is closed in the state pulling back the exhaust gases discharged into the exhaust passage, and, due to a delay in return of the exhaust gases, the residual gas quantity, that is the internal EGR quantity, becomes smaller. Moreover, this tendency is attributable to the inertia, and affected by engine speed Ne, too. As engine speed Ne becomes higher, the inertia is increased, and hence the influence exerted on the internal EGR quantity is increased. When EVC is after TDC, the exhaust gas flow changes and hence the influence of the inertia is great, so that the decrease of the internal EGR quantity due to an increase of engine speed Ne becomes greater. At positions away from top dead center, the piston speed is higher, and the amount of change of the internal EGR quantity with respect to a change in engine speed Ne increases.

Thus, base EGR quantity EVEGR0 is increased as the extent of separation (such as an angular distance in terms of degrees in crank shaft rotation) of EVC from exhaust TDC (that is, TDC on the exhaust stroke) becomes larger. Base EGR quantity EVEGR0 is increased with increase in engine speed Ne on the BTDC side, and base EGR quantity EVEGR0 is decreased with increase in engine speed Ne on the ATDC side. The rate of decrease of base EGR quantity EVEGR0 with respect to increase in engine speed Ne on the ATDC side is greater than the rate of increase of base EGR quantity EVEGR0 with respect to increase in engine speed Ne on the BTDC side.

Reverting to FIG. 3, step S3 is for examining whether there is a valve overlap between target opening timing IVO of intake valve 5 and target closing timing EVC of exhaust valve 6.

If there is no overlap, then control unit 10 proceeds to step S4, and sets an overlap correction quantity OLEGR1 for correcting the internal EGR quantity, to zero (OLEGR1=0). Consequently, estimated internal EGR quantity EGRREM is set equal to base internal EGR quantity EVRGR0 (EGRREM=EVRGR0) at a next step S8.

Figure 5:
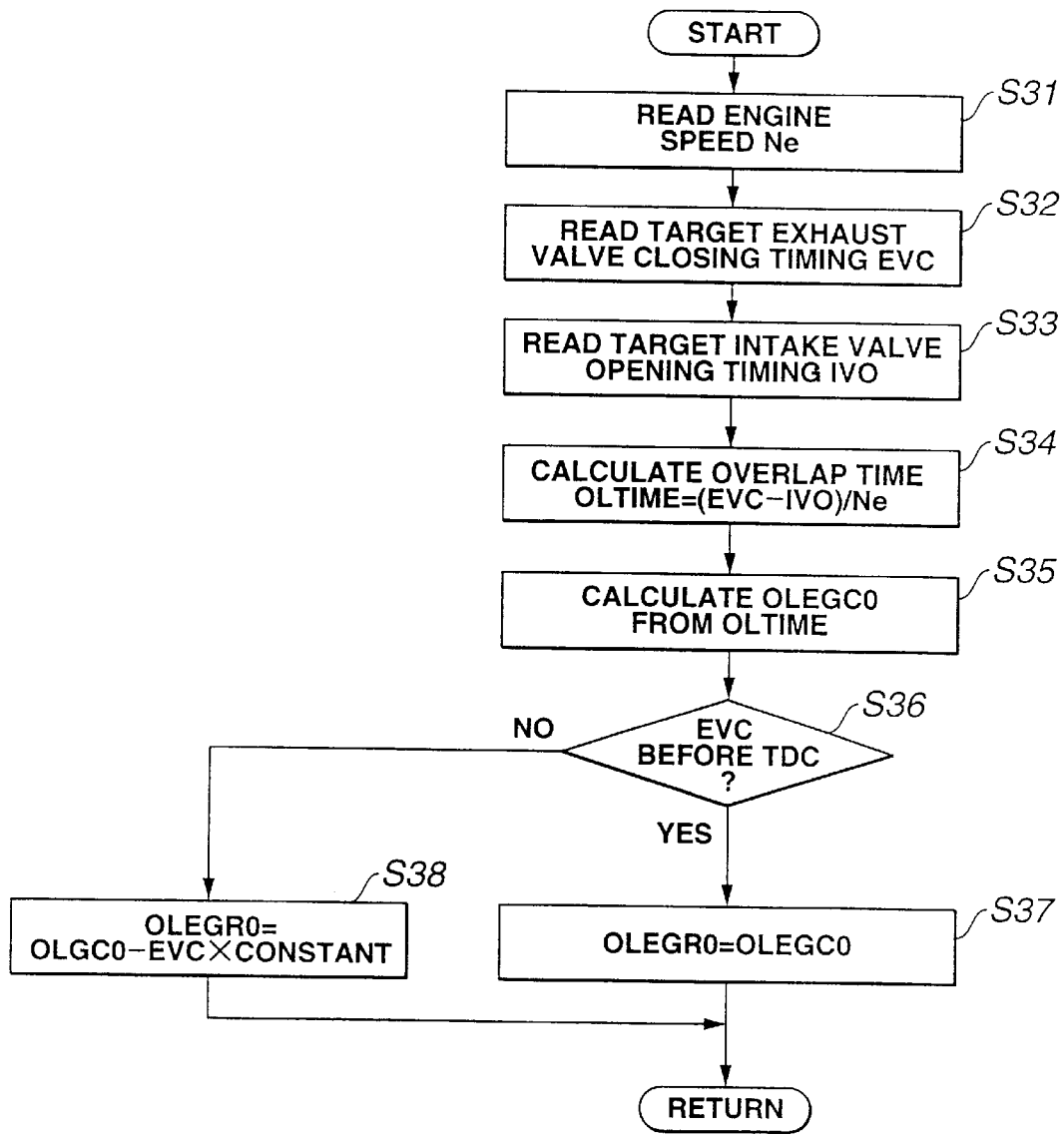
FIG. 5 is a flowchart showing a subroutine for determining an overlap correction quantity used to modify the base internal EGR quantity.

If there is a valve overlap, control unit 10 proceeds from step S3 to step S5, and calculates a base overlap correction quantity OLEGR0 by a subroutine shown in FIG. 5.

At steps S31, S32 and S33, control unit 10 reads engine speed Ne, target exhaust valve closing timing EVC of exhaust valve 6 and intake valve opening timing IVO of intake valve 5. At step S34, control unit 10 converts a valve overlap quantity (expressed in degrees of crankshaft rotation) to a valve overlap time OLTIME by using the input values of Ne, EVC and IVO according to the following equation.

$$OLTIME=(EVC-IVO)/Ne$$

Then, at step S35, control unit 10 determines an intermediate quantity OLEGC0 from valve overlap time OLTIME by lookup from a map table. Thus, step 35 determines a value of quantity (intermediate quantity) OLEGC0 corresponding to the current value of valve overlap time OLTIME.

Figure 10:
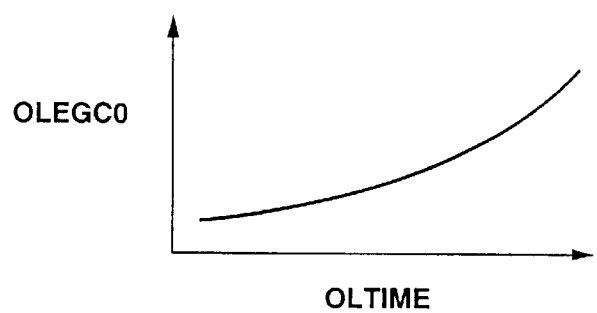
FIG. 10 is a graph showing a characteristic of a quantity OLEGC0 with respect to a valve overlap time OLTIME, which can be used in the subroutine of FIG. 5.

In this example, the intermediate quantity OLEGC0 is increased monotonically with increase in valve overlap time OLTIME, as shown in FIG. 10.

At step S36, control unit 10 examines whether exhaust valve closing timing EVC is on the BTDC side or on the ATDC side.

When EVC is before TDC, control unit 10 proceeds from step S36 to step S37, and sets quantity OLEGC0 determined at step S35, as base overlap (increase) correction quantity OLEGR0 directly without modification (OLEGR0= OLEGC0).

Wh65 to step S38, and determines base overlap (increase) correction quantity OLEGR0 by modifying the obtained value of OLEGC0 in accordance with target closing timing EVC by the following equation.

$$OLEGR0=OLEGC0-EVC(retard\ quantity\ after\ TDC) \times constant$$

Figure 8:
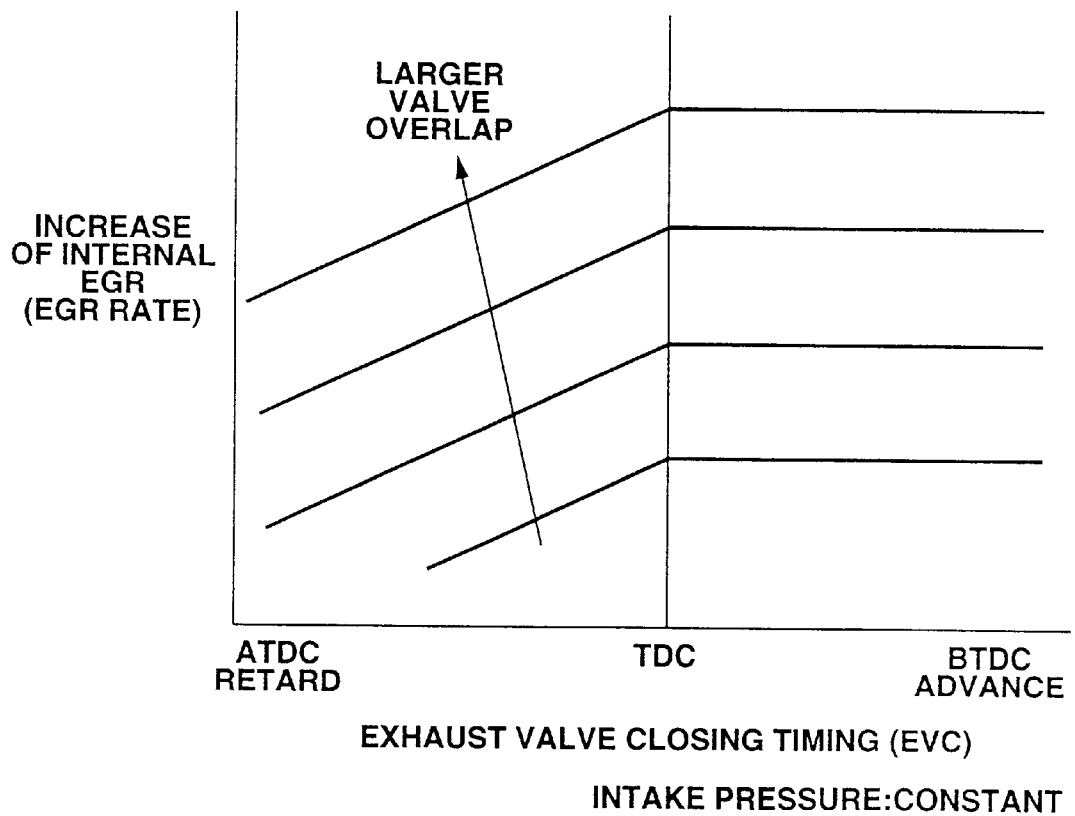
FIG. 8 is a graph showing a characteristic of the overlap correction quantity.

The variation quantity (or increase quantity) of the internal EGR between the base internal EGR quantity in the non-overlap state and the internal EGR quantity in the valve overlap state varies, even for the same valve overlap quantity (or time), since the influence of back-flow differs in dependence on exhaust valve closing timing EVC. FIG. 8 shows variation of the increase quantity of the internal EGR quantity with respect to EVC for different values of the overlap quantity (time) on the condition that engine speed Ne is constant and the intake pressure is constant.

When EVC is judged to be before TDC, the internal EGR increase quantity (OLEGR0) is held approximately constant irrespective of changes in EVC, as shown in FIG. 8. In the case of EVC being before TDC, burned gases in the cylinder tend to be sucked back into the intake port on the lower pressure side during the valve overlap, rather than being expelled into the exhaust port, and the backward flow becomes dominant. Then, the burned gases of the back-flow to the intake port are sucked again into the cylinder in the subsequent intake stroke, so that the EGR rate is approximately constant. Therefore, the correction by EVC (the advance quantity before top dead center) is not performed at step S37.

When EVC is after TDC, the quantity of exhaust back-flow into the intake port decreases because of downward movement of the piston during the valve overlap. Moreover, as EVC is shifted away from top dead center, the intake negative pressure in the cylinder increase, and the pressure difference from the intake negative pressure in the intake port decreases. Therefore, the tendency to the exhaust back-flow decreases. In the overlap state, as compared to the non-overlap state, the quantity of return flow of exhaust gases from the exhaust port into the cylinder increases (, so that the scavenging efficiency decreases) by transmission of the intake negative pressure into the cylinder through the opening of the intake valve, and the internal EGR quantity increases accordingly. However, this increase quantity in the internal EGR quantity is large when the overlap is around top dead center, but this increase quantity decreases as the overlap shifts away from TDC. When the overlap is near top dead center, the influence from the intake negative pressure on the condition in the cylinder is great as compared with the non-overlap state where the intake valve is not opened, and therefore, the internal EGR increase quantity due to the return of the exhaust gases is large. When, on the other hand, the overlap is away from TDC, the difference between the intake negative pressure increased by the downward movement of the piston in the non-overlap state where the intake valve held closed during this period, and the intake negative pressure transmitted from the intake port into the cylinder during the overlap becomes smaller, and hence the difference in the exhaust return flow quantity between the overlap state and the non-overlap state becomes smaller. Namely, the increase in the internal EGR quantity due to the return-flow of the exhaust gases during the overlap decreases as the overlap (or EVC) shifts away from TDC.

For the reasons above, when EVC is after TDC, the increase (OLEGR0) of the internal EGR quantity due to overlap is decreased as EVC shifts away from TDC, as shown in FIG. 8.

Therefore, step 38 performs the subtraction by the subtrahend proportional to EVC (the retard quantity after TDC).

Reverting to FIG. 3, step S6 calculates an intake pressure modification coefficient OLEGCB for modifying the thus-calculated base overlap correction quantity OLEGR0 in accordance with the intake pressure (boost pressure).

Base overlap correction quantity OLEGR0 is calculated as an increase quantity of the internal EGR quantity due to a valve overlap under the condition where the intake pressure is constant (−50 mmHg). Even for the same overlap quantity (or time) and EVC, the exhaust back-flow quantity is varied by a variation in the intake pressure. This is taken into account by modification based on the intake pressure. In the case where there is provided no throttle valve, and the intake pressure is held approximately constant at the atmospheric pressure, the modification can be omitted. However, the modification based on the intake pressure is needed or desired when the intake pressure is controlled at a predetermined level by throttling the opening degree of throttle valve 15, to supply the vacuum pressure for braking, or for the suction of evaporative fuel vapor and blow-by gas into the intake system, and the intake air quantity is controlled by controlling the intake valve closing timing in consideration of the intake pressure.

Figure 6:
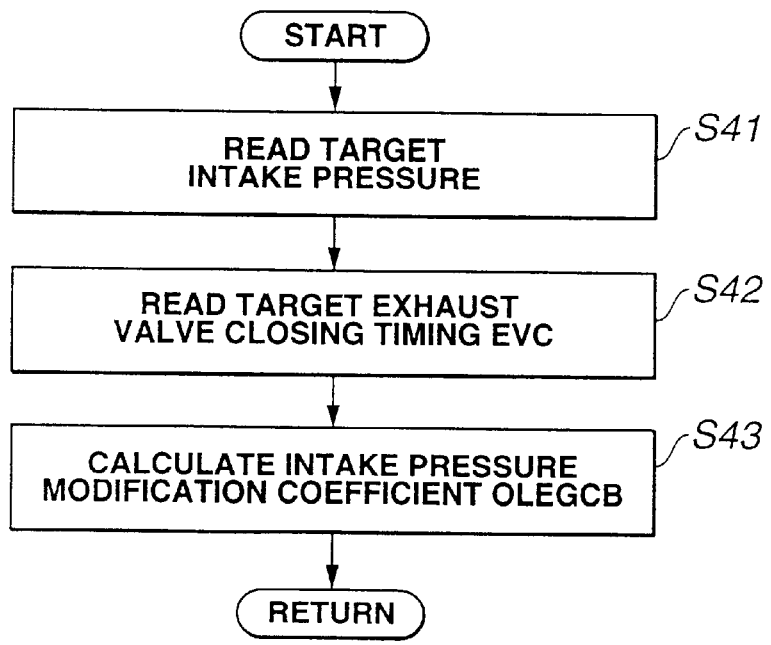
FIG. 6 is a flowchart showing a subroutine for determining a modification coefficient based on an intake pressure, for modifying the overlap correction quantity.

Intake pressure modification coefficient OLEGCB is calculated by a subroutine shown in FIG. 6.

Figure 9:
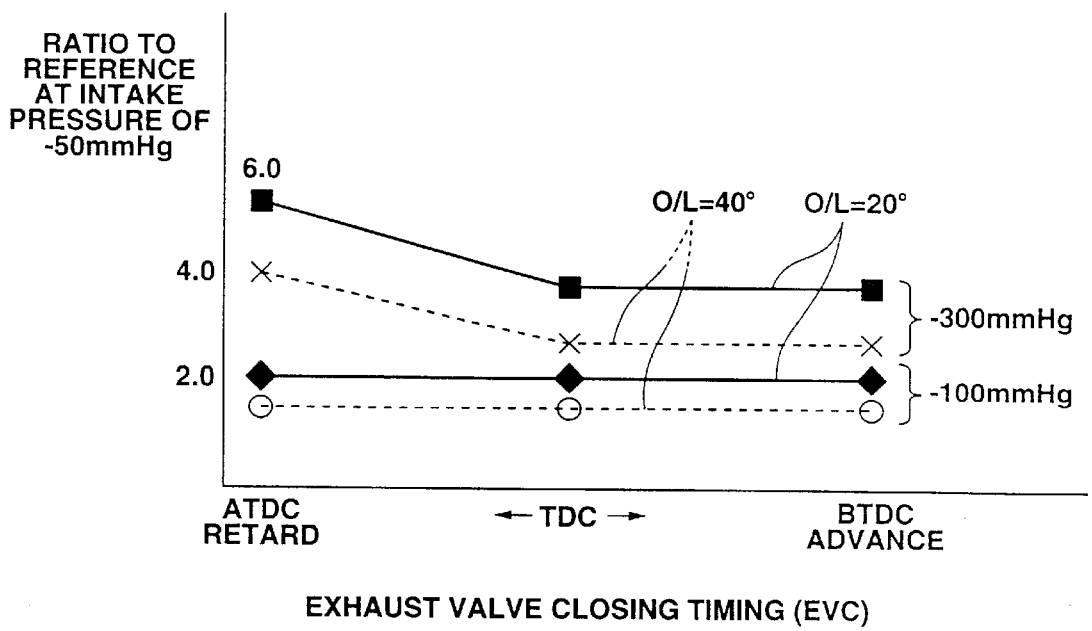
FIG. 9 is a graph for illustrating influence of the intake pressure on the base correction quantity.

Step S41 reads the target intake pressure calculated by the above-mentioned intake pressure control process of controlling the intake pressure by controlling the throttle opening degree. Step S42 reads target closing timing EVC of exhaust valve 6. In accordance with the values of these input quantities, step S43 obtains a value of intake pressure modification coefficient OLEGCB by lookup from a map table prepared on the basis of characteristic data, as shown in FIG. 9. FIG. 9 shows a magnification (or multiplying factor) which is a ratio of the internal EGR increase quantity under the condition of intake pressure (negative pressure)

being equal to −100 mmHg or −300 mmHg to the internal EGR increase quantity under the condition of intake pressure being equal to −50 mmHg. For each of the intake pressure conditions of −100 mmHg and −300 mmHg, there are shown two characteristic lines in the two cases of overlap quantity (crank angle) being equal 20° and 40°. As shown in FIG. 9, at an intake pressure of −100 mmHg, the magnification remains constant at about 2 irrespective of variation in EVC (the middle of the valve overlap period). At an intake pressure of −300 mmHg, on the other hand, the magnification is held constant at about 3~4 when EVC is before TDC, and the magnification is increased linearly with increase in the extent of separation of EVC from TDC when EVC is after TDC. When EVC is after TDC at a constant intake pressure (−50 mmHg), as mentioned before, the pressure difference in the cylinder due to the existence and nonexistence of a valve overlap becomes smaller as EVC is shifted away from TDC, so that the increase quantity of the exhaust back-flow quantity tends to decrease. However, when the intake negative pressure increases to −300 mmHg, the pressure difference in the cylinder due to the existence and nonexistence of a valve overlap becomes greater, so that the increase quantity is held at a larger level, and hence the magnification is increased as compared to the example of −50 mmHg.

Thus, the control system of this example increases the modification quantity OLEGCB as an absolute value of the intake pressure increases on the negative side, and increases the modification quantity OLEGCB in accordance with the retard quantity or angle of the exhaust valve closing timing EVC from the exhaust top dead center when the exhaust valve closing timing EVC is after the exhaust top dead center and the absolute value of the intake pressure is higher than a predetermined level.

Reverting to FIG. 3, step S7 calculates a final overlap correction quantity OLEGR1 by multiplying base correction quantity OLEGR0 calculated at step S5 by intake pressure modification coefficient OLEGCB calculated at step S6 (OLEGR1=OLEGR0×OLEGCB).

Step S8 calculates estimated internal EGR quantity EGRREM by addition of overlap correction quantity OLEGR1 calculated at step S7, to base internal EGR quantity EVEGR0 calculated at step S2. Thus, the internal EGR quantity is estimated by adding the calculated overlap increase correction quantity OLEGR1 to base internal EGR quantity EVEGR0.

*EGRREM=EVEGR0+OLEGR1*

Step S9 calculates a modified target air quantity HQH0FM by modifying target air quantity FQH0EM calculated at step S1, in accordance with estimated internal EGR quantity EGRREM.

*HQH0FM=FQH0EM×(1+EGRREM)*

This modification is not intended to change the target air quantity per se, but it is a modification for convenience to take account of changes in the intake valve closing timing required to obtain the target air quantity (the quantity of fresh air) caused by the internal EGR quantity. Thus, the target air quantity is calculated as a total amount of gases in the cylinder by adding the quantity of the internal EGR gas to the target air quantity.

Step S10 calculates target closing timing IVC of intake valve 5 in accordance with modified target air quantity HQH0FM.

Therefore, the control unit delivers a valve control signal corresponding to target intake valve closing timing IVC, to the above-mentioned electromagnetic drive unit, and thereby controls intake valve 5 so that intake valve 5 is closed at target intake valve closing timing IVC.

This control system estimates the internal EGR quantity in accordance with engine operating conditions accurately by taking account of valve overlap period, and controls the actual intake valve closing timing by modifying the target intake valve closing timing in accordance with the estimated internal EGR quantity. Therefore, the control system can obtain a quantity of fresh air suited to the target intake air quantity and control the torque accurately.

In the illustrated embodiment, engine 1 is a prime mover of a motor vehicle, and control unit 10 includes, as a main component, at least one onboard computer.

This application is based on a Japanese Patent Application No. 11-344216. The entire contents of this Japanese Patent Application No. 11-344216 with a filing date of Dec. 3, 1999 are hereby incorporated by reference.

Although the invention has been described above by reference to certain embodiments of the invention, the invention is not limited to the embodiments described above. Modifications and variations of the embodiments described above will occur to those skilled in the art in light of the above teachings. The scope of the invention is defined with reference to the following claims.

What is claimed is:

1. A control apparatus for controlling an intake air quantity to the engine by varying an intake valve closing timing of the engine, the control apparatus comprising:
   a controller configured
   to calculate a target air quantity in accordance with an engine operating state,
   to calculate an estimated internal EGR quantity of the engine in accordance with the engine operating state,
   to calculate a target intake valve closing timing in accordance with the target air quantity and the estimated internal EGR quantity, and
   to control an actual intake air quantity to the engine by controlling an actual intake valve closing timing of the engine to achieve the target intake valve closing timing.

2. The control apparatus as claimed in claim 1, wherein the control apparatus further comprises a variable valve timing actuator comprising a solenoid to vary the actual intake valve closing timing in response to an electric control signal produced by the controller, and a sensor system to sense engine operating conditions to determine the engine operating state.

3. The control apparatus as claimed in claim 1, wherein the controller is configured to calculate the estimated internal EGR quantity in accordance with a target exhaust valve closing timing for the engine and an engine speed of the engine.

4. The control apparatus as claimed in claim 3, wherein the controller is configured to calculate a base internal EGR quantity in accordance with the target exhaust valve closing timing and the engine speed, and to determine the estimated internal EGR quantity by modifying the base internal EGR quantity with an overlap correction quantity determined in accordance with a valve overlap condition of the engine.

5. The control apparatus as claimed in claim 4, wherein the controller is configured to determine a valve overlap quantity in accordance with an interval between a target intake valve opening timing and the target exhaust valve closing timing, and to determine the estimated internal EGR quantity by addition of the overlap correction quantity to the base internal EGR quantity.

6. The control apparatus as claimed in claim 5, wherein the controller is configured to increase the base internal EGR quantity with increase in an interval from one of an exhaust top dead center and the target exhaust valve closing timing to the other.

7. The control apparatus as claimed in claim 5, wherein the controller is configured to increase the base internal EGR quantity as the engine speed increases when the target exhaust valve closing timing is before an exhaust top dead center.

8. The control apparatus as claimed in claim 5, wherein the controller is configured to decrease the base internal EGR quantity as the engine speed increases when the target exhaust valve closing timing is after an exhaust top dead center.

9. The control apparatus as claimed in claim 5, wherein the controller is configured to increase the estimated internal EGR quantity by increasing the overlap correction quantity with increase in the valve overlap quantity representing a valve overlap period.

10. The control apparatus as claimed in claim 8, wherein the controller is configured to increase the estimated internal EGR quantity by increasing the overlap correction quantity with increase in an absolute value of an intake pressure on a negative pressure side.

11. The control apparatus as claimed in claim 8, wherein the controller is configured to calculate the overlap correction quantity by modifying a base correction quantity determined by the valve overlap quantity, with an intake pressure modification quantity determined in accordance with an intake pressure and the target exhaust valve closing timing.

12. The control apparatus as claimed in claim 11, wherein the controller is configured to determine the valve overlap quantity by converting a valve overlap angular interval expressed as an angular distance in crankshaft rotation to a valve overlap time period.

13. The control apparatus as claimed in claim 11, wherein the controller is configured to determine an intermediate quantity in accordance with the valve overlap quantity, to set the base correction quantity equal to the intermediate quantity when the target exhaust valve closing timing is before an exhaust top dead center, and to determine the base correction quantity by subtraction from the intermediate quantity, of a subtrahend proportional to a retard quantity of the exhaust valve closing timing with respect to the exhaust top dead center when the target exhaust valve closing timing is after the exhaust top dead center.

14. The control apparatus as claimed in claim 11, wherein the controller is configured to determine a modification coefficient, as the modification quantity, in accordance with the intake pressure, the target exhaust valve closing timing and the valve overlap quantity; and wherein the controller is configured to calculate the overlap correction quantity by multiplying the base correction quantity by the modification coefficient.

15. The control apparatus as claimed in claim 11, wherein the controller is configured to increase the modification quantity as an absolute value of the intake pressure increases on a negative side, and to increase the modification quantity in accordance with a retard quantity of the exhaust valve closing timing from an exhaust top dead center when the exhaust valve closing timing is after the exhaust top dead center and the absolute value of the intake pressure is higher than a predetermined level.

16. The control apparatus as claimed in claim 5, wherein the controller is configured to calculate the estimated internal EGR quantity by decreasing the overlap correction quantity with increase in a retard of the target exhaust valve closing timing from an exhaust top dead center when the target exhaust valve closing timing is after the exhaust top dead center.

17. The control apparatus as claimed in claim 5, wherein the controller is programmed to determine the estimated internal EGR quantity by addition, to the base internal EGR quantity, of an overlap increase correction quantity which is increased as the valve overlap quantity increases; and wherein the controller is programmed to modify the base internal EGR quantity with the overlap increase correction quantity when the target exhaust valve closing timing is after the target intake valve opening timing, and to set the estimated internal EGR quantity equal to the base internal EGR quantity when the target exhaust valve closing timing is not after the target intake valve opening timing.

18. The control apparatus as claimed in claim 17, wherein the controller is programmed to increase the base internal EGR quantity with increase in an advance of the exhaust valve closing timing from the exhaust top dead center when the exhaust valve closing timing is before the exhaust top dead center, and to increase the base internal EGR quantity with increase in a retard of the exhaust valve closing timing from the exhaust top dead center when the exhaust valve closing timing is after the exhaust top dead center; and wherein the controller is programmed to determine the overlap increase correction quantity in accordance with the valve overlap quantity, the target exhaust valve closing timing and an intake pressure controlled by a throttle valve.

19. A control apparatus for controlling an intake air quantity to an engine by controlling an intake valve closing timing of the engine, the control apparatus comprising:

means for determining an estimated internal EGR quantity in accordance with an engine operating state;

means for determining a target intake valve closing timing in accordance with at least the estimate internal EGR quantity; and means for controlling the intake air quantity to the engine by controlling an actual intake valve closing timing of the engine to the target intake valve closing timing.

20. A control process for varying valve timings of intake and exhaust valves of an engine, the control process comprising:

estimating an internal EGR quantity in accordance with an engine operating state; and controlling an intake valve closing timing in accordance with a required intake air quantity and the internal EGR quantity.

* * * * *